A. M. McDOUGALL

VESSEL

Feb. 9, 1932. Re. 18,350

Original Filed Oct. 6, 1928

INVENTOR.

BY A. Miller McDougall
Geo. Stearns.
ATTORNEYS.

Reissued Feb. 9, 1932

Re. 18,350

UNITED STATES PATENT OFFICE

ALEXANDER MILLER McDOUGALL, OF CHICAGO, ILLINOIS

VESSEL

Original No. 1,773,369, dated August 19, 1930, Serial No. 310,802, filed October 6, 1928. Application for reissue filed October 24, 1931. Serial No. 570,988.

My invention relates to vessels and has special reference to one designed for use in the transportation of railroad cars wherein the breaking of bulk at rail and water terminals is avoided.

The object of my present invention is to provide a vessel having three or more decks with exceptionally convenient means for loading and unloading the same.

Other objects and advantages of the invention will appear in the following description thereof.

Referring now to the accompanying drawings, forming part of this application, and wherein like reference characters indicate like parts:

Figures 1, 2, 3, 4:
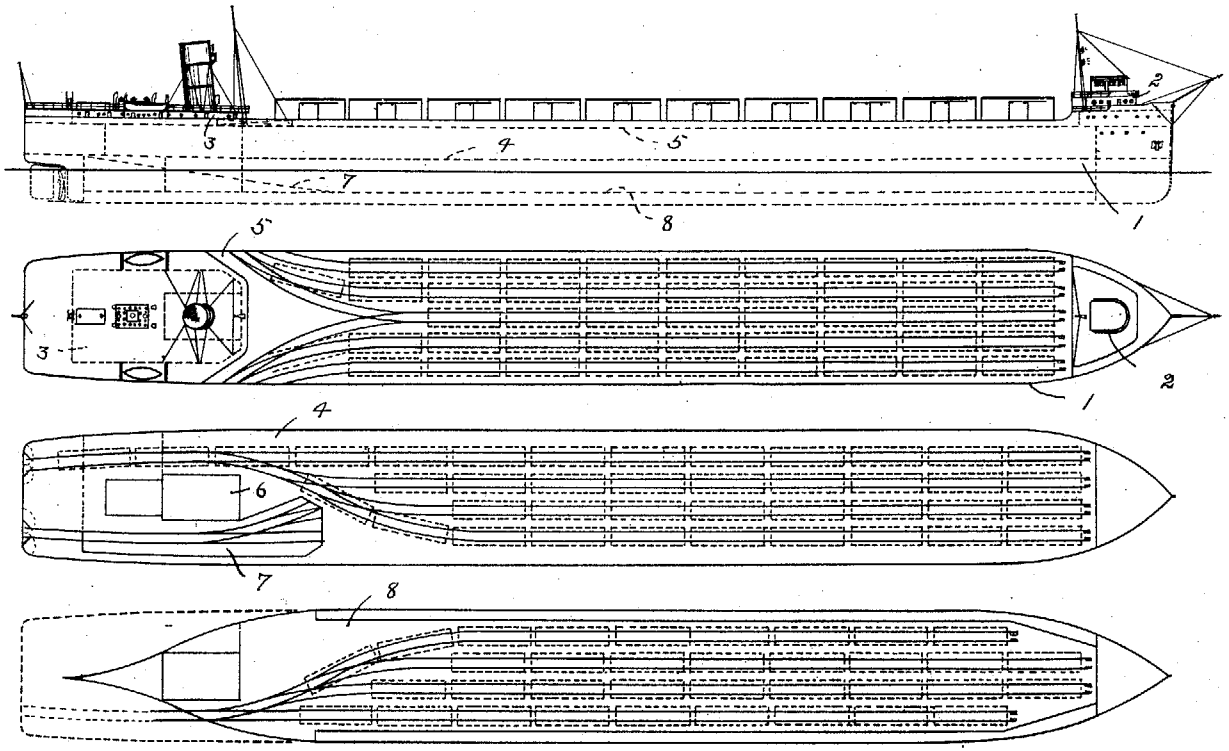
Figure 1 is a side elevation of my improved vessel as it would appear loaded with railroad cars.
Figure 2 is a top plan view of Figure 1.
Figure 3 is a plan view of an intermediate deck.
Figure 4 is a plan view of the tank top.

1 represents the vessel which is of the self propelled type, having fore and aft deck houses 2 and 3 respectively. It will be noted from the plan views of the accompanying drawings that the after side lines of the vessel are carried normally full so that ample room is provided for trackage upon either side of the after deck house, and the moving of box cars or other rolling stock fore and aft thereupon, thereby avoiding the necessity of providing a stepped deck as illustrated in my patent issued August 12th, 1930, No. 1,772,612, as both the 'tween deck 4 and upper deck 5 are of equal dimensions and extend to the stern of the vessel.

The after deck house or cabin 3 occupies the major portion of the after part of the upper deck 5, while the 'tween deck after house indicated at 6 is sufficiently reduced in size to permit of the passage to and fro of railroad cars upon either side thereof, as clearly illustrated in Figure 3 of the drawings.

Upon one side of the 'tween deck house 6, the 'tween deck 4 extends to the stern of the vessel and upon which cars are loaded and unloaded to and from said deck, while upon the opposite side of the 'tween deck house an inclined deck or gangway 7 is provided for the passage to and fro of railroad cars to the tank top deck 8, the cars to both of these decks being received on the same level through the stern of the vessel.

The cars upon the upper deck 5 are loaded and unloaded through the bulwark just abreast the forward end of the after deck house 3 in a similar manner to that shown in my patent issued August 19, 1930, No. 1,773,368.

It will be noted that for suitable head room above the forward portion of the inclined gangway 7 the deck 4 must be cut away forming an open forwardly enlarged hatchway forwardly of the 'tween deck house 6, as clearly seen in Figure 3 of the drawings, this however not interfering with the loading of the cars on the 'tween deck 4 upon the opposite side of the 'tween deck house 6.

By this novel form of ship construction it is evident that I have provided means whereby the least possible amount of carrying space of the vessel is lost, yet permitting of the cars being loaded and unloaded upon their own wheels and with the least possible adjustment of any mechanism in accomplishing same.

It is obvious that while the accompanying drawings illustrate the vessel being used for the transportation of railroad cars, the same advantage of the novel construction accrues to the use of the vessel in transporting other forms of vehicles, such as automobiles or the like.

Having thus described my invention, what I claim and desire to secure by Letters Patent, is:

1. The combination with a vessel of the type described having a tank top deck, a 'tween deck and an upper deck for the reception of railroad cars, and an after 'tween deck house, of a track upon one side of the 'tween deck house for ingress and egress of the cars to the 'tween deck, and an inclined track upon the opposite side of said house for ingress and egress of the cars to the tank top deck.

2. The combination with a vessel of the type described having a tank top deck, a 'tween deck for the reception of vehicles, and an after 'tween deck house, of a track upon one side of said house for ingress and egress of the vehicles to the 'tween deck, and an inclined track upon the opposite side of the 'tween deck house for ingress and egress of the vehicles to the tank top deck.

3. The combination with a vessel having spaced decks therein for the transportation of vehicles, and an after house, of a track upon one side of said house for ingress and egress to the uppermost deck through the stern of the vessel, and an inclined track upon the opposite side of the after house for ingress and egress through the stern of the vessel to the lowermost deck.

4. A vessel having spaced decks for the transportation of vehicles, of means upon one of said decks for the reception of vehicles through one side of the stern to said deck, and an inclined track upon the other side of said deck for the reception of vehicles through the stern to an adjacent deck.

5. A vessel having an after deck house and spaced decks for the transportation of vehicles, of means upon one side of said house for the reception of vehicles through the stern of the vessel upon one deck, and means including an inclined track upon the other side of said house for the reception of vehicles through the stern upon an adjacent lower deck.

6. A vessel of the type described having a tank-top deck, a main deck, and a 'tween deck for the reception of vehicles, the main deck having means for the ingress and egress of the vehicles in the after part of the vessel forward of the after house, the 'tween deck having means for the ingress and egress of the vehicles upon one side of the after house through the stern of the vessel, and the tank top deck having means for the ingress and egress of the vehicles upon the opposite side of the after house through the stern of the vessel.

7. A vessel having spaced decks for the transportation of vehicles, a plurality of tracks upon the main portion of said decks, an after house, a single track upon either side of said house for ingress and egress of the vehicles through the stern of the vessel to the main portion of the decks, characterized by said single tracks each communicating directly with a plurality of tracks upon the main portion of a deck, and one of said single tracks including an inclined track communicating with a lower deck.

8. A vessel having a plurality of tracks upon the main portion of decks thereof and an after deck house, said vessel having means for loading and unloading through the stern upon either side of said deck house and including a track upon either side thereof, further characterized by each of said loading tracks directly communicating with all of the tracks on the main portion of the respective deck served.

In witness whereof, I have hereunto set my hand this 21st day of October, 1931.

ALEXANDER MILLER McDOUGALL.